US010523715B1

(12) United States Patent
Jiang et al.

(10) Patent No.: US 10,523,715 B1
(45) Date of Patent: Dec. 31, 2019

(54) ANALYZING REQUESTS FROM AUTHENTICATED COMPUTING DEVICES TO DETECT AND ESTIMATE THE SIZE OF NETWORK ADDRESS TRANSLATION SYSTEMS

(71) Applicant: Symantec Corporation, Mountain View, CA (US)

(72) Inventors: Kevin Jiang, San Mateo, CA (US); Ilya Sokolov, Boston, MA (US); Rickey Ray, Goleta, CA (US)

(73) Assignee: Symantec Corporation, Mountain View, CA (US)

( * ) Notice: Subject to any disclaimer, the term of this patent is extended or adjusted under 35 U.S.C. 154(b) by 562 days.

(21) Appl. No.: 15/249,272

(22) Filed: Aug. 26, 2016

(51) Int. Cl.
*H04L 29/06* (2006.01)
*H04L 29/12* (2006.01)

(52) U.S. Cl.
CPC ........ *H04L 63/205* (2013.01); *H04L 61/2503* (2013.01); *H04L 63/06* (2013.01); *H04L 63/0876* (2013.01); *H04L 63/1458* (2013.01)

(58) Field of Classification Search
CPC ... H04L 63/205; H04L 63/06; H04L 63/0876; H04L 63/1458; H04L 61/2503
See application file for complete search history.

(56) References Cited

U.S. PATENT DOCUMENTS

| | | | | |
|---|---|---|---|---|
| 7,433,325 B1* | 10/2008 | Sagy | ..................... | H04L 43/022 370/254 |
| 7,630,364 B2* | 12/2009 | Stewart | ............. | H04L 29/12462 370/389 |
| 7,761,558 B1* | 7/2010 | Jindal | ..................... | H04L 67/02 709/223 |
| 8,068,414 B2* | 11/2011 | Huegen | ................. | H04L 63/126 370/230 |
| 8,185,953 B2* | 5/2012 | Rothstein | ............ | H04L 63/1416 726/22 |
| 8,191,119 B2* | 5/2012 | Wing | ................ | H04L 29/06027 713/151 |
| 8,504,504 B2* | 8/2013 | Liu | ..................... | H04L 63/1458 706/46 |
| 8,819,816 B2* | 8/2014 | Stein | ...................... | G06F 15/16 726/22 |
| 9,148,434 B2* | 9/2015 | Yu | ......................... | G06F 21/577 |
| 9,674,195 B1* | 6/2017 | Jiang | ....................... | H04L 63/10 |
| 9,807,092 B1* | 10/2017 | Gutzmann | .......... | H04L 63/1458 |
| 9,998,492 B2* | 6/2018 | Fan | ......................... | H04L 63/10 |
| 2005/0108551 A1* | 5/2005 | Toomey | .................. | G06F 21/31 713/185 |
| 2006/0198311 A1* | 9/2006 | Molen | ..................... | H04L 43/16 370/241 |

(Continued)

*Primary Examiner* — Khalil Naghdali
(74) *Attorney, Agent, or Firm* — Patent Law Works LLP

(57) ABSTRACT

A NAT system is identified as operating in conjunction with a specific IP address, in response to a threshold number of different authenticated computing devices making requests to the web service from the specific IP address during a given time period. The total number of computing devices operating from behind the identified NAT system is estimated, based on how many separate authenticated computing devices make requests to the web service from the IP address during the period of time. When a NAT system is identified, one or more additional action(s) are taken to manage the processing of traffic originating from the specific IP address, taking into account that multiple computing devices are operating behind the identified NAT system. An example action is rate limiting.

20 Claims, 3 Drawing Sheets

(56) References Cited

U.S. PATENT DOCUMENTS

| | | | |
|---|---|---|---|
| 2007/0022474 A1* | 1/2007 | Rowett | H04L 63/0218 726/11 |
| 2007/0022479 A1* | 1/2007 | Sikdar | H04L 63/0218 726/22 |
| 2007/0127491 A1* | 6/2007 | Verzijp | H04L 47/10 370/395.2 |
| 2007/0266426 A1* | 11/2007 | Iyengar | H04L 9/3213 726/5 |
| 2009/0144806 A1* | 6/2009 | Gal | H04L 63/083 726/3 |
| 2010/0217837 A1* | 8/2010 | Ansari | G06Q 30/04 709/218 |
| 2011/0047256 A1* | 2/2011 | Babu | H04L 29/12367 709/223 |
| 2014/0237539 A1* | 8/2014 | Wing | H04L 63/08 726/1 |
| 2015/0026793 A1* | 1/2015 | Li | H04L 63/0281 726/12 |
| 2015/0089585 A1* | 3/2015 | Novack | H04L 63/08 726/3 |
| 2015/0188949 A1* | 7/2015 | Mahaffey | H04L 63/20 726/1 |
| 2015/0264068 A1* | 9/2015 | Beauchesne | H04L 63/1416 726/23 |
| 2016/0028764 A1* | 1/2016 | Vasseur | H04L 63/1458 726/23 |
| 2016/0057166 A1* | 2/2016 | Chesla | H04L 63/02 726/23 |
| 2018/0027006 A1* | 1/2018 | Zimmermann | H04L 63/0245 726/11 |
| 2018/0198796 A1* | 7/2018 | Chien | H04L 63/101 |

* cited by examiner

ANALYZING REQUESTS FROM AUTHENTICATED COMPUTING DEVICES TO DETECT AND ESTIMATE THE SIZE OF NETWORK ADDRESS TRANSLATION SYSTEMS

TECHNICAL FIELD

This disclosure pertains generally to computer security, and more specifically to analyzing requests made by authenticated, computing devices from specific Internet Protocol ("IP") addresses, in order to detect and estimate the size of Network Address Translation ("NAT") systems.

BACKGROUND

Most modern web services implement some kind of rate limiting to mitigate the effect of online attacks. Generally, rate limiting systems block IP addresses that exceed some threshold of activity. This technique is used to protect against denial of service attacks ("DOS") and other types of malicious activity based on bombarding a server with requests or other types of activity (e.g., web scraping, online password attacks, etc.).

Conventional rate limiting breaks down when receiving communications from large Network Address Translation ("NAT") systems, where a large number of users appear to the web service as a single IP address. NAT is a methodology of modifying network address information in IP packet headers while they are in transit across a traffic routing device, for the purpose of remapping one IP address space into another. NAT is often used to hide an entire IP address space, usually consisting of private network IP addresses, behind a single IP address in a public address space. This mechanism can be implemented in a router that uses translation tables to map the hidden addresses into a single, visible IP address, and readdresses the outgoing IP packets on exit so they appear to originate from the routing device. In the reverse communications path, responses are mapped back to the originating IP addresses using the translation tables.

Without a reliable way to identify NAT systems and how many users are behind them, it is difficult for a web service to set appropriate rate limiting thresholds. If the threshold is set too high for the actual number of users behind the NAT, denial of service attacks and the like are not deterred. On the other hand, if the threshold is set too low, legitimate users will be blocked from using the service.

It would be desirable to address these issues.

SUMMARY

The size of identified NAT systems is automatically estimated based on multiple authenticated computing devices making requests to a web service from individual IP addresses. More specifically, multiple IP addresses are identified, from which requests are made to the web service by authenticated computing devices. It is tracked how many separate authenticated computing devices make requests to the web service from each specific identified IP address over a given period of time. This can take the form of analyzing requests made to the web service from identified IP addresses, and examining authentication credentials contained therein. The examined authentication credentials uniquely identify corresponding originating authenticated computing devices. More specifically, the authentication credentials can be in the form of any unique identifiers provided to authenticated computing devices by the web service, for example during the registration process (e.g., registration/product keys, activated device identifiers, etc.). In one embodiment, authentication credentials can be in the form of private keys stored in unextractable media on hardware devices supplied by the web service, such as a hardware security module ("HSM"). Note that there is a non-trivial cost to obtain each authentication credential, because there is an associated monetary cost to license/register each individual computing device to access the web service. This makes it prohibitively expensive for a malicious party to spoof a large NAT system.

A NAT system is identified as operating in conjunction with a specific one of the IP addresses, in response to a threshold number of different authenticated computing devices making requests to the web service from the specific IP address within a specific amount of time. The total number of computing devices operating from behind the identified NAT system is estimated, based on how many separate authenticated computing devices make requests to the web service from the specific IP address during the time period. For example, the total number of computing devices operating from behind the identified NAT system can be estimated to be the total number of separate authenticated computing devices that make requests to the web service from the specific IP address during the specific period of time, or the estimate can be based on the rate at which separate authenticated computing devices make requests.

When a NAT system is identified, one or more additional action(s) are taken to manage the processing of traffic originating from the specific IP address. These additional actions take into account that multiple separate computing devices are operating behind the identified NAT system in conjunction with the specific IP address, as opposed to the specific IP address being associated with a single computing device. In one embodiment, the additional action taken is in the form of adjusting the rate limiting policy of the web service for the specific IP address, for example by increasing the rate limiting threshold for the specific IP address, based on the estimated total number of computing devices operating from behind the identified NAT system. Such an adjustment can be made directly by setting the threshold to a desired value based on the estimated size of the NAT system, or indirectly, for example by providing the estimated NAT size to a machine learning model to use as a factor to learn a rate limiting threshold empirically. Other rate limiting options are also possible, such as using Completely Automated Public Turning test to tell Computers and Humans Apart ("CAPTCHA") based rate limiting for the specific IP address.

In one embodiment, in order to account for Dynamic Host Configuration Protocol ("DHCP") at the Wide Area Network ("WAN") level, the number of high frequency requests (e.g., long poll operations) originating from IP addresses of identified NAT systems per time period are monitored. In response to detecting a change in the number or rate of high frequency requests originating from an IP address of a specific identified NAT, it is determined that the IP address has been released by a first network and assigned to a second network. Appropriate action can then be taken, such as adjusting the corresponding rate limiting.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
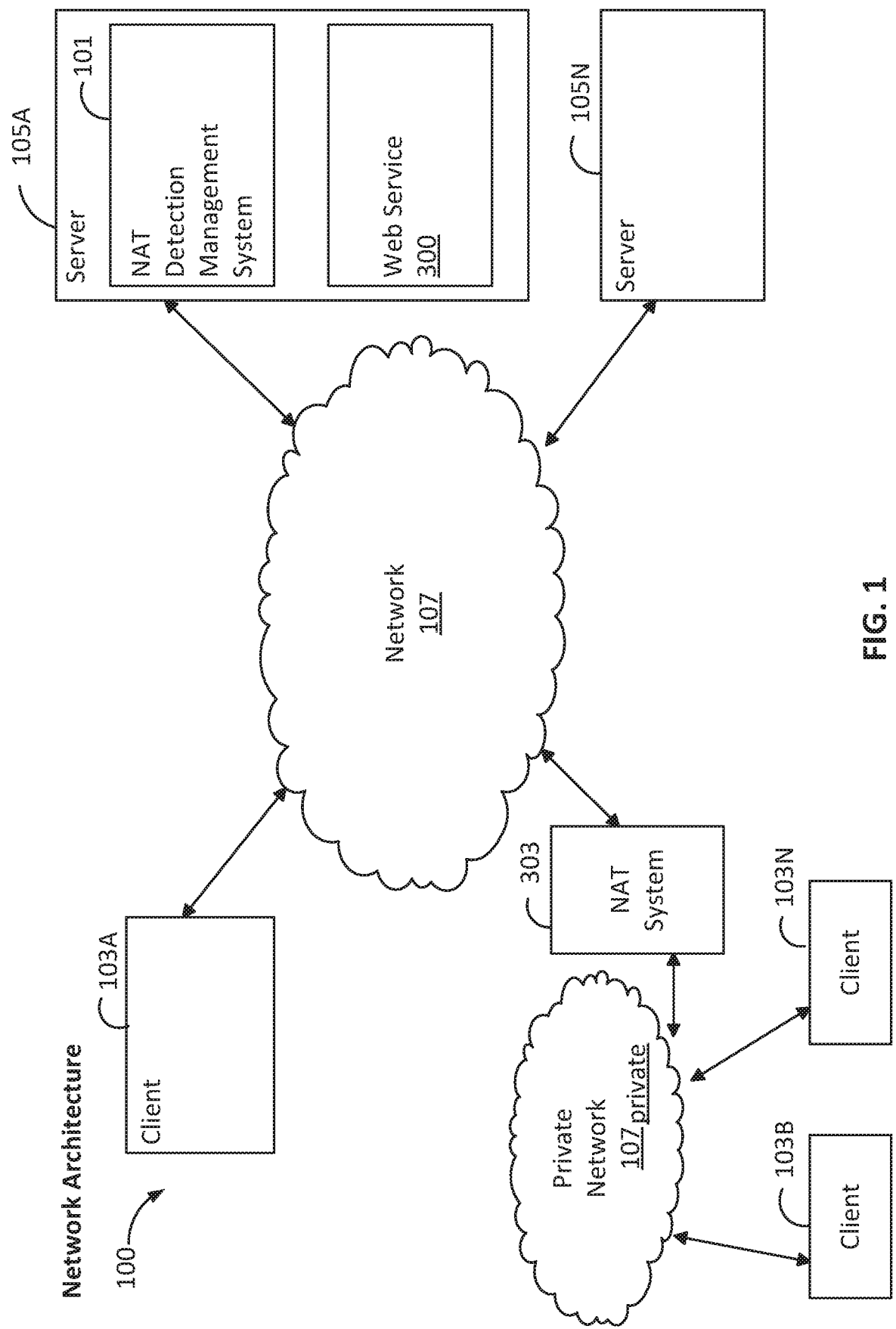
FIG. 1 is a block diagram of an exemplary network architecture in which a NAT detection management system can be implemented, according to some embodiments.

FIG. 1 is a block diagram illustrating an exemplary network architecture 100 in which a NAT detection management system 101 can be implemented. The illustrated network architecture 100 comprises multiple clients 103A, 103B and 103N, as well as multiple servers 105A and 105N. In FIG. 1, a NAT detection management system 101 is illustrated as residing on server 105A, and operating in conjunction with a web service 300. It is to be understood that this is an example only, and in various embodiments various functionalities of this system 101 can be instantiated on a client 103, a server 105, or can be distributed between multiple clients 103 and/or servers 105.

The NAT detection management system 101 operates in conjunction with different web services 300 in different embodiments. The web service 300 can be in the form of any service (typically a combination of one or more application(s) and data) made available from a provider's server 105 (or more typically collection of servers 105 and other backend computing resources) to authenticated web-connected endpoint computing devices 210 (e.g., client computers 105). Some examples of web services 300 are enterprise and endpoint computer security systems, storage management systems, customer or human resources management systems, etc.

In FIG. 1, client 103A talks to network 107 directly, whereas clients 103B and 103N talk to network $107_{PRIVATE}$, which is in turn connected to network 107 through a NAT system 303. The use of NAT systems 303 within the context of the NAT detection management system 101 is described in greater detail below in conjunction with FIG. 3. Although FIG. 1 illustrates three clients 103 and two servers 105 as an example, in practice many more (or fewer) clients 103 and/or servers 105 can be deployed. In one embodiment, network 107 is in the form of the internet, and private network $107_{PRIVATE}$ is in the form of a private enterprise level network. Other networks 107 or network-based environments can be used in other embodiments.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop computers, laptop computers, or mobile computing devices, comprising portable computer systems capable of connecting to a network 107 and running applications. Such mobile computing devices are sometimes referred to as smartphones, although some mobile phones not so designated also have these capabilities. Tablet computers are another example of mobile computing devices.

Figure 2:
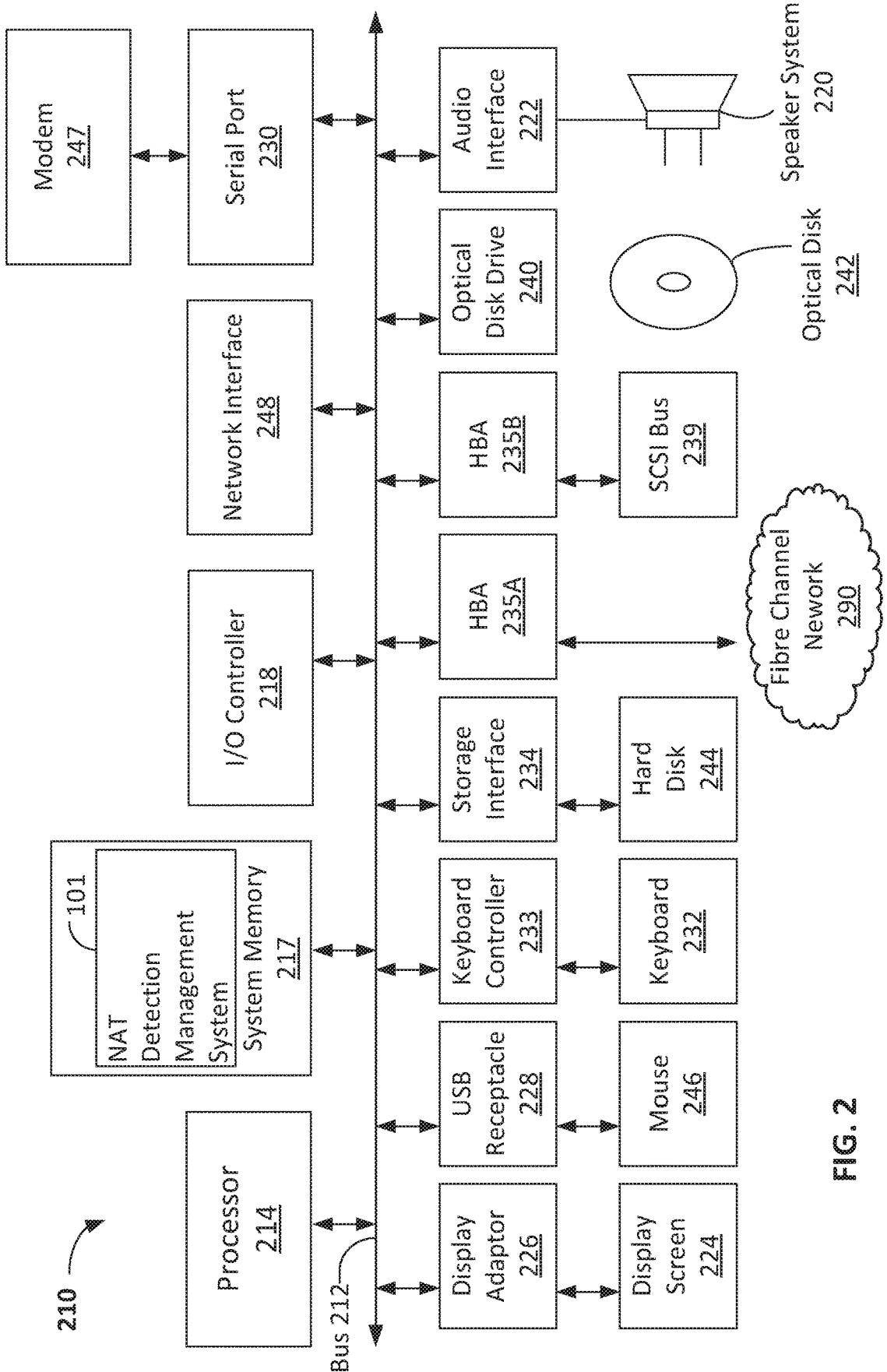
FIG. 2 is a block diagram of a computer system suitable for implementing a NAT detection management system, according to some embodiments.

FIG. 2 is a block diagram of a computer system 210 suitable for implementing a NAT detection management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the NAT detection management system 101 is illustrated as residing in system memory 217. The workings of the NAT detection management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
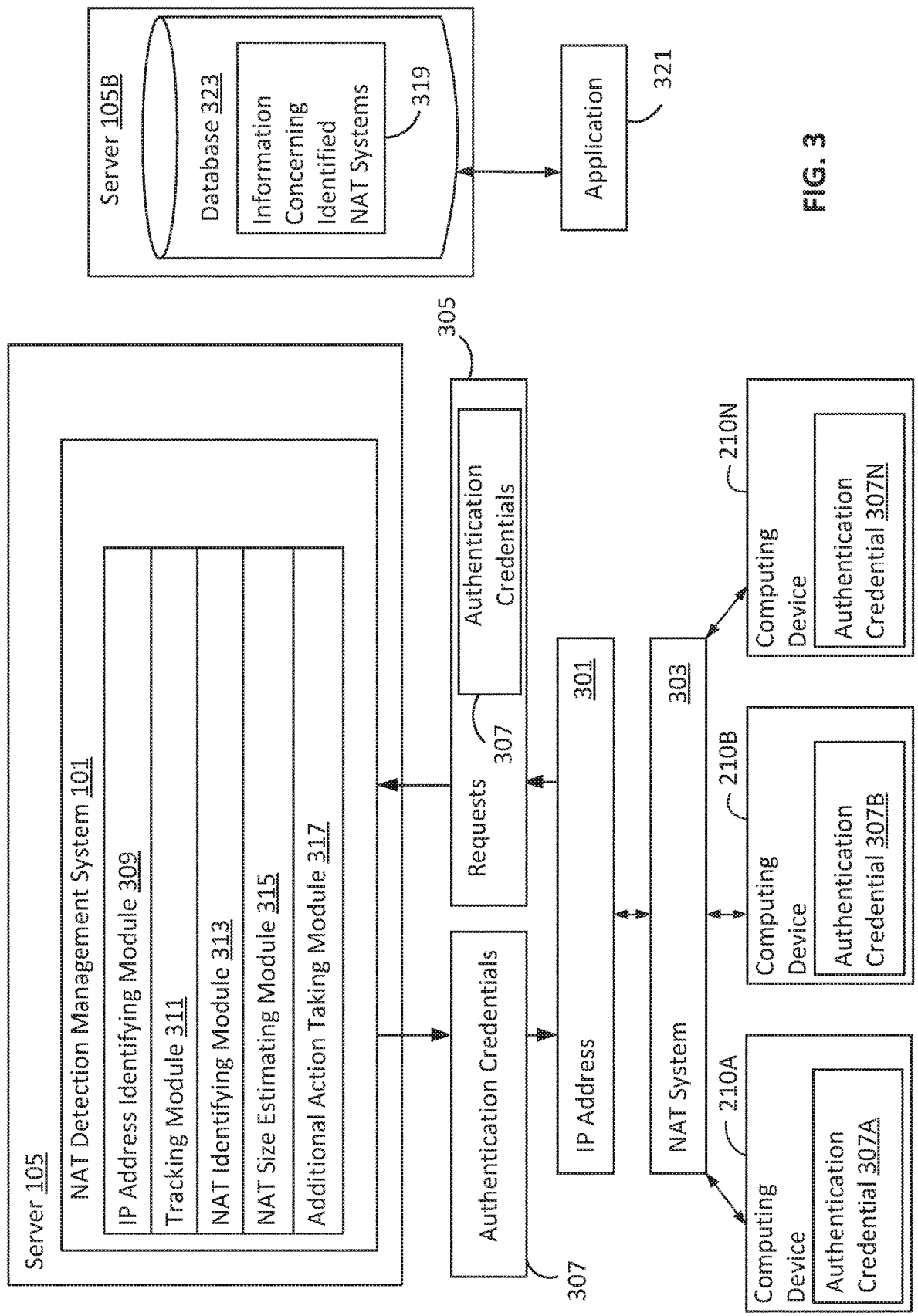
FIG. 3 is a block diagram of the operation of a NAT detection management system, according to some embodiments.

FIG. 3 illustrates the operation of a NAT detection management system 101, according to some embodiments. In FIG. 3, the NAT detection management system 101 is illustrated as residing on a server 105 and running in conjunction with a web service 300. As described above, the functionalities of the NAT detection management system 101 can reside on a client 103, a server 105, or be distributed between multiple computer systems 210, including within a cloud-based computing environment in which the functionality of the NAT detection management system 101 is provided as a service over a network 107. It is to be understood that although the NAT detection management system 101 is illustrated in FIG. 3 as a single entity, the illustrated NAT detection management system 101 represent a collection of functionalities, which can be instantiated as a single or multiple modules as desired (an instantiation of specific, multiple modules of the NAT detection management system 101 is illustrated in FIG. 3). In some embodiments, certain functionalities of the NAT detection management system 101 and the web service 300 overlap. In some embodiments, the different modules of the NAT detection management system 101 can reside on different computing devices 210 as desired. It is to be understood that the modules of the NAT detection management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the NAT detection management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the NAT detection management system 101 identifies and estimates the size of NAT systems 303 based on the number of separate authenticated computing devices 210 that make requests 305 to the web service 300 from individual IP addresses 301. When requests 305 from a threshold number of separate authenticated computing devices 210 originate from a single IP address 301 within a given time period, it can be reliably concluded that the IP address 301 is running a NAT system 303, with multiple computing devices 210 operating behind it. Based on the number of separate authenticated computing devices 210 that make requests 305 from the single IP address 301 within measured periods of time, the NAT detection management system 101 can estimate the number of computing devices 210 behind the detected NAT system 303. The NAT detection management system 101 can then take appropriate actions based on having identified the NAT system 303, for example by adjusting the rate limiting policy for the IP address 301 to reflect the estimated size.

Users register to access the web service 300 using specific computing devices 210. More specifically, when users activate licenses to use the web service 300, the licenses are tied to specific computing devices 210 at an individual or organizational level. For example, an individual user can purchase a license authorizing the use of the web service 300 from one computer 210. When the user activates the license, the user registers a specific computing device 210 (e.g., a given desktop or smartphone) with the web service 300. In another example scenario, the user's license could cover use from two separate devices 210, such as a desktop and a smartphone, each of which would be registered with the web service 300. In a similar manner, where a given corporation purchases a multi-user license (e.g., a license for one hundred seats), an administrator or the like registers specific computing devices 210 within the organization with the web service 300. It is to be understood that the license terms can vary between embodiments, but in each such scenario the web service 300 authenticates the registered computing devices 210, associates the license with the specific corresponding authenticated computing device(s) 210, and tracks those devices 210 which have been authenticated, for example by maintaining a database (or other suitable storage mechanism) mapping licensing information to specific, corresponding authenticated computing devices 210. The specific format and content of the data stored therein can vary between embodiments, with the general point being that the web service 300 keeps track of licensed, authenticated computing devices 210.

In the course of utilizing the web service 300, licensed computing devices 210 make numerous requests 305 to the web service 300 (e.g., requests 305 for specific service operations and the like). Each request 305 is authenticated by the web service 300, to ensure that the associated services are only provided to authorized, licensed parties. For this purpose, the web service 300 provides each licensed authenticated computing device 210 with a unique authentication credential 307. Each authenticated computing device 210 then includes its authentication credential 307 in each request 305 to the web service 300, and the web service 300 reviews the authentication credential 307, to ensure that the requesting device 210 is authorized to make the request 305 according to the terms of the license.

The content and format of authentication credentials 307 can vary between embodiments, but can consist of a unique identifier provided to the computing device 210 by the web service 300 during the registration process, such as an activated device id, a registration or product key, etc. In one embodiment, an authentication credential 307 can be in the form of a private key stored in an unextractable medium on a hardware device provided to the user by the web service 300, such as an HSM. Regardless of the exact format, each authentication credential 307 uniquely identifies the computing device 210 presenting the credential 307 to the web service 300, and thus can be used by the web service to authenticate the requesting computing device 210 as being registered and authorized to use the web service 300 according to the corresponding terms of the license. Registered computing devices 210 are typically initially provided with their authentication credentials 307 in association with the licensing/registration process. Because there is a cost to license each individual computing device 210 to access the web service 300, there is a cost to obtain each associated authentication credential 307.

As described in detail below, the NAT detection management system 101 uses the authentication credentials 307 to identify requests 305 made by authenticated computing devices 210 from specific IP addresses 301, in order to detect and estimate the size of NAT systems 303. The authentication credentials 307 are thus used to protect against a malicious entity tricking the NAT detection management system 101 into raising its access rate by pretending to be a large NAT system 303. Authentication credentials 307 can be used to robustly protect against such spoofing because each one has a non-trivial expensive. More specifically, a license for each seat has a specific monetary cost, which varies between embodiments and circumstances, but could be in the range of, e.g., $30-50 depending upon the specific web service 300. It therefore becomes quite expensive for such an attacker to attempt to raise rate limits by simulating multiple unique endpoint devices 210 each consuming a license seat. For a single user to maliciously simulate a NAT system 303 consisting of, e.g., one hundred unique computing devices 100 operating behind a single IP address 301, the malicious party would need to obtain one hundred authentication credentials 307 by purchasing a license for one hundred users. At, for example, $40 per seat, the malicious party would thus need to spend $4000 to simulate a 100 NAT system 303 with 100 computing devices 100 and attempt to trick the NAT detection management system 101 into raising the rate limit accordingly.

In order to utilize authentication credentials 307 to detect and estimate the size of NAT systems 303, as requests 305 to the web service 300 are made by authenticated registered, authenticated computing devices 210, an IP address identifying module 309 of the NAT detection management system 101 identifies the IP addresses 301 from which the requests 305 originate. Working in conjunction with the IP address identifying module 309, an authenticated computing device tracking module 311 of the NAT detection management system 101 tracks the number of different authenticated computing devices 210 that make requests 305 to the web service 300 from each separate identified IP address 301, over a given period of time. The measured period of time (e.g., five minutes, one hour, one day) is a variable design parameter which can be adjusted up and/or down as desired.

In order to track how many separate authenticated computing devices 210 make requests 305 to the web service 300 from the given identified IP address 301 within the given period of time, the authenticated computing device tracking module 311 can analyze requests 305 made to the web service 300 from the given identified IP address 301, and examine authentication credentials 307 contained therein. The authenticated computing device tracking module 311 can identify the specific computing device 210 which makes a given request 305 based on the authentication credential 307 contained therein, which as explained above uniquely identifies the corresponding, authenticated computing device 210.

By tracking this information, the number of different computing devices 210 that make requests 305 to the web service 300 from a single IP address 301 within a given window of time is determined. Whenever a threshold number of separate computing devices 210 is identified as making requests 305 from a single IP address 301 within a specific amount of time, a NAT identifying module 313 of the NAT detection management system 101 identifies a NAT system 303 as operating in conjunction with the IP address 301. In other words, the NAT identifying module 313 identifies the specific IP address 301 from which the requisite number of separate computing devices 210 made requests 305 within the specific period of time as an IP address 301 which fronts a NAT system 303. The threshold number of computing devices 210 (e.g., three, ten, fifty) and the measured period of time (e.g., five minutes, one hour, one day) are variable design parameters which can be adjusted up and/or down separately or in conjunction with each other as desired.

In order for an attacker to successfully trick the NAT detection management system 101 into treating a personal IP address 301 as a NAT system 303, s/he would have to obtain multiple authentication credentials 307, and simulate requests 305 as coming from multiple separate computing devices 210 within a requisite period of time. Because each authentication credential 307 has a non-trivial cost, the expense of faking large numbers of computing devices 210 with corresponding unique authentication credentials 307 becomes prohibitive. Thus, the receipt of authenticated requests 305 from a requisite number of separate computing devices 210 from a single IP address 301 within a sufficiently short period of time is considered reliable evidence that a NAT system 303 utilized by multiple computing device 210 is operating behind the IP address 301.

Once a NAT system 303 has been identified, a NAT size estimating module 315 of the NAT detection management system 101 can estimate the size of the NAT system 303. In one embodiment, the NAT size estimating module 315 estimates the NAT size as being the number of separate authenticated computing devices 210 that made requests 307 to the web service 300 from the IP address 301 during the given period of time. In other embodiments, the NAT size estimating module 315 makes this estimate based on the rate at which different computing devices 210 make authenticated requests 305 originating from the IP address 301. The specific formula used to estimate the NAT size (e.g., the total number of computing devices 210 operating from behind the identified NAT system 303) can vary between embodiments, and can be adjusted over time as desired. Such a formula can be a function of number of computing devices 210 that make at least one authenticated request 305, number of authenticated requests 305, and time. Once the NAT detection management system 101 has established the estimated NAT size for each IP address 301, this information can be shared with other web services for dynamically changing their rate limits, as described below.

After having identified and estimated the size of a NAT system 303 behind a given IP address 301, an additional action taking module 317 of the NAT detection management system 101 can take appropriate additional action to properly manage the detected NAT system 303. For example, the additional action taking module 317 can adjust the rate limiting policy of the corresponding web service 300 for the given IP address 301, taking into account that multiple computing devices 210 are being operated by multiple users from behind the IP address 301. It is to be understood that in different scenarios, thresholds for rate limiting can be set to a specific value (e.g., automatically by a software tool or manually by an administrator), or determined empirically using machine learning. In an embodiment where rate limiting thresholds are set to a given value, the additional action taking module 317 can use the estimated size of the NAT systems 303 to define rate limiting thresholds for the specific IP addresses 301. In a machine learning scenario, the estimated size of the NAT system 303 can be used as a factor in a machine learning model.

Note that the specific action to take to alter the rate limiting policy is a variable design parameter. For example, in one embodiment the additional action taking module 317 can increase the rate limiting threshold for the IP address 301, based on the estimated size of the NAT system 303. In another embodiment, the additional action taking module 317 can use Completely Automated Public Turning test to tell Computers and Humans Apart ("CAPTCHA") based rate limiting, instead of blocking requests over the threshold for the IP address 301 (e.g., rather than increasing the threshold for requests from the IP address 301, applying a CAPTCHA such as prompting the user to type the letters of a distorted image for requests over the threshold). In yet another embodiment, the additional action taking module 317 could disable rate limiting for the IP address 301 altogether, and instead monitor the IP address 301 for suspicious activity in a different manner, such as applying heuristic based analysis. It is to be further understood that adjusting rate limiting activity for an IP address 301 determined to front a NAT system 303 is only one example use case for the NAT detection management system 101. In other use cases, once NAT systems 303 have been detected by the NAT detection management system 101 as described above, other responsive actions to manage the identified NAT systems 303 can be taken as desired. The NAT detection management system 101 has identified a NAT system 303 with an estimated number of total computing devices 210 as operating behind a single, specific IP address 301. In response, the additional action taking module 317 can take any appropriate action to manage the processing of traffic originating from that IP address 301, in order to take into account that multiple computing devices 210 are operating separate computing devices 210 behind the single IP address 301, as opposed to the IP address 301 being associated with a single computing device 210 and user. In some embodiments, the additional action taking module 317 shares information 319 concerning identified NAT systems 303 with other applications 321 that do not specifically implement the detection feature. This can be implemented, for example, by storing this information 319 in a database 323 or other suitable storage component on a server 105 (or combination of computing devices 210) such that it is accessible to other applications 321 with which the information is to be shared.

In one embodiment, the NAT detection management system 101 addresses an additional concern regarding DHCP at the WAN level. DHCP is a standardized network protocol used on IP networks 107 for dynamically distributing configuration parameters including IP addresses 301. Under DHCP, computers 210 request IP addresses and other networking parameters automatically from a DHCP server 105 (not specifically illustrated), reducing the need for an administrator to configure these settings manually. Under WAN level DHCP, external IP addresses 301 are dynamic. Thus, a larger LAN 107 could release an IP address 301 which could subsequently be assigned to a smaller network 107, or vice versa. Therefore, when operating under WAN level DHCP, the number of computing devices 210 running behind a single IP address 301 can change over time, as IP addresses 301 are released by and assigned to differently sized networks 107. For example, suppose a small business running a previously identified NAT system 303 with, e.g., an estimated twenty computers 210, releases its IP address 301 which is subsequently picked up by a single user home network 107. Unless the NAT detection management system 101 detects this change, the single user home network 107 would be falsely classified as a twenty computer NAT system 303, and allowed to make twenty times the normal amount of requests 305, which could be used to mount an attack.

To address this concern, the NAT detection management system 101 monitors the number of high frequency requests (e.g., unique long polls, periodic reputation queries, etc.) coming from any given IP address 301 per period of time. High frequency requests such as long polls are "live" traffic, so a change in their frequency originating from a given IP address 301 is indicative of a corresponding change in network 107 size. Thus, the NAT detection management system 101 can detect the dynamic release and acquisition of an IP address 301 between differently sized networks 107 by detecting a drop or increase in the number of high frequency requests thereof per time period that exceeds a given threshold. The NAT detection management system 101 can in turn adjust the corresponding estimated NAT size nearly instantaneously. It is to be understood that the threshold and time periods to use are variable design parameters.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:
1. A computer implemented method for automatically identifying and estimating the size of Network Address Translation ("NAT") systems based on multiple authenticated computing devices making requests to a web service from individual Internet Protocol ("IP") addresses, the method comprising the steps of:
   identifying, by a computer, multiple IP addresses from which requests are made to the web service by authenticated computing devices;
   for each identified IP address, tracking, by the computer, how many separate authenticated computing devices make requests to the web service from the given identified IP address, over a given period of time based on examining authentication credentials contained in the requests and uniquely identifying corresponding authenticated computing devices;
   identifying, by the computer, a NAT system as operating in conjunction with a specific IP address of the identified IP addresses, in response to a threshold number of different authenticated computing devices making requests to the web service from the specific IP address within a specific period of time;
   estimating, by the computer, a total number of computing devices operating from behind the identified NAT system, based on how many separate authenticated com- puting devices make requests to the web service from the specific IP address during the specific period of time;

taking at least one additional action, by the computer, to manage the processing of traffic originating from the specific IP address, wherein the at least one additional action takes into account that multiple computing devices are operating behind the identified NAT system operating in conjunction with the specific IP address, as opposed to the specific IP address being associated with a single computing device;

monitoring a number of high frequency requests originating from IP addresses of identified NAT systems per period of time; and responsive to detecting a change in a number of high frequency requests originating from an IP address of a specific identified NAT, determining that the IP address has been released by a first network and assigned to a second network.

2. The method of claim 1 wherein tracking how many separate authenticated computing devices make requests to the web service from the given identified IP address further comprises:

analyzing the requests made to the web service from the given identified IP address; and wherein examining authentication credentials is based on analyzing the requests.

3. The method of claim 1 wherein the authentication credentials further comprise:

unique identifiers provided to the authenticated computing devices by the web service.

4. The method of claim 1 wherein the authentication credentials further comprise:

registration keys provided to the authenticated computing devices by the web service.

5. The method of claim 1 wherein the authentication credentials further comprise:

activated device identifiers provided to the authenticated computing devices by the web service during a registration process.

6. The method of claim 1 wherein the authentication credentials further comprise:

product keys provided to the authenticated computing devices by the web service during a registration process.

7. The method of claim 1 wherein the authentication credentials further comprise:

private keys stored in unextractable media on hardware supplied by the web service.

8. The method of claim 1 wherein estimating the total number of computing devices operating from behind the identified NAT system further comprises:

estimating the total number of computing devices operating from behind the NAT system to be a total number of separate authenticated computing devices that make requests to the web service from the specific IP address during the specific period of time.

9. The method of claim 1 wherein estimating the total number of computing devices operating from behind the identified NAT system further comprises:

estimating the total number of computing devices operating from behind the NAT system based on a rate at which separate authenticated computing devices make requests to the web service from the specific IP address during the specific period of time.

10. The method of claim 1 wherein taking the at least one additional action to manage the processing of traffic originating from the specific IP address further comprises:

adjusting a rate limiting policy of the web service for the specific IP address.

11. The method of claim 10 wherein adjusting the rate limiting policy of the web service for the specific IP address further comprises:

increasing a rate limiting threshold for the specific IP address, based on the estimated total number of computing devices operating from behind the identified NAT system.

12. The method of claim 10 wherein adjusting the rate limiting policy of the web service for the specific IP address further comprises:

providing the estimated total number of computing devices operating from behind the identified NAT system to a machine learning model to use as a factor to learn a rate limiting threshold for the specific IP address.

13. The method of claim 10 wherein adjusting the rate limiting policy of the web service for the specific IP address further comprises:

using Completely Automated Public Turning test to tell Computers and Humans Apart ("CAPTCHA") based rate limiting for the specific IP address.

14. The method of claim 1 wherein estimating the total number of computing devices operating from behind the identified NAT system is further based on how many separate authenticated computing devices make at least one request to the web service from the specific IP address during the specific period of time and a number of the requests.

15. The method of claim 1 wherein monitoring the number of high frequency requests originating from the IP addresses of identified NAT systems per period of time further comprises:

monitoring a number of long poll operations originating from the IP addresses of identified NAT systems per period of time.

16. At least one non-transitory computer readable-storage medium for automatically identifying and estimating the size of Network Address Translation ("NAT") systems based on multiple authenticated computing devices making requests to a web service from individual Internet Protocol ("IP") addresses, the at least one non-transitory computer readable-storage medium storing computer executable instructions that, when loaded into computer memory and executed by at least one processor of a computing device, cause the computing device to perform the following steps:

identifying, by a computer, multiple IP addresses from which requests are made to the web service by authenticated computing devices;

for each identified IP address, tracking, by the computer, how many separate authenticated computing devices make requests to the web service from the given identified IP address, over a given period of time based on examining authentication credentials contained in the requests and uniquely identifying corresponding authenticated computing devices;

identifying, by the computer, a NAT system as operating in conjunction with a specific IP address of the identified IP addresses, in response to a threshold number of different authenticated computing devices making requests to the web service from the specific IP address within a specific period of time;

estimating, by the computer, a total number of computing devices operating from behind the identified NAT system, based on how many separate authenticated computing devices make requests to the web service from the specific IP address during the specific period of time;

taking at least one additional action, by the computer, to manage the processing of traffic originating from the specific IP address, wherein the at least one additional action takes into account that multiple computing devices are operating behind the identified NAT system operating in conjunction with the specific IP address, as opposed to the specific IP address being associated with a single computing device;

monitoring a number of high frequency requests originating from IP addresses of identified NAT systems per period of time; and responsive to detecting a change in a number of high frequency requests originating from an IP address of a specific identified NAT, determining that the IP address has been released by a first network and assigned to a second network.

17. The at least one non-transitory computer readable-storage medium of claim 16 wherein tracking how many separate authenticated computing devices make requests to the web service from the given identified IP address further comprises:

analyzing the requests made to the web service from the given identified IP address; and wherein examining the authentication credentials is based on analyzing the requests.

18. The at least one non-transitory computer readable-storage medium of claim 16 wherein taking the at least one additional action to manage the processing of traffic originating from the specific IP address further comprises:

adjusting a rate limiting policy of the web service for the specific IP address.

19. The at least one non-transitory computer readable-storage medium of claim 18 wherein adjusting the rate limiting policy of the web service for the specific IP address further comprises:

increasing a rate limiting threshold for the specific IP address, based on the estimated total number of computing devices operating from behind the identified NAT system.

20. A computer system for automatically identifying and estimating the size of Network Address Translation ("NAT") systems based on multiple authenticated computing devices making requests to a web service from individual Internet Protocol ("IP") addresses, the computer system comprising:

at least one processor;

system memory;

an IP address identifying module residing in the system memory, the IP address identifying module being programmed to identify multiple IP addresses from which requests are made to the web service by authenticated computing devices;

an authenticated computing device tracking module residing in the system memory, the authenticated computing device tracking module being programmed to, for each identified IP address, track how many separate authenticated computing devices make requests to the web service from the given identified IP address, over a given period of time based on examining authentication credentials contained in the requests and uniquely identifying corresponding authenticated computing devices, monitoring a number of high frequency requests originating from IP addresses of identified NAT systems per period of time, and responsive to detecting a change in a number of high frequency requests originating from an IP address of a specific identified NAT, determining that the IP address has been released by a first network and assigned to a second network;

a NAT identifying module residing in the system memory, the NAT identifying module being programmed to identify a NAT system as operating in conjunction with a specific IP address of the identified IP addresses, in response to a threshold number of different authenticated computing devices making requests to the web service from the specific IP address within a specific period of time;

a NAT size estimating module, residing in the system memory, the NAT size estimating module being programmed to estimate a total number of computing devices operating from behind the identified NAT system, based on how many separate authenticated computing devices make requests to the web service from the specific IP address during the specific period of time; and an additional action taking module, residing in the system memory, the additional action taking module being programmed to take at least one additional action to manage the processing of traffic originating from the specific IP address, wherein the at least one additional action takes into account that multiple computing devices are operating behind the identified NAT system operating in conjunction with the specific IP address, as opposed to the specific IP address being associated with a single computing device.

* * * * *